United States Patent [19]
Ogasawara

[11] Patent Number: 5,523,664
[45] Date of Patent: Jun. 4, 1996

[54] SYSTEM FOR ALLEVIATING FATIGUE IN A SEAT

[75] Inventor: Hiromitsu Ogasawara, Akishima, Japan

[73] Assignee: Tachi-S Co., Ltd., Tokyo, Japan

[21] Appl. No.: 224,276

[22] Filed: Apr. 7, 1994

[51] Int. Cl.$^6$ .............................. B60N 2/22; G05B 11/00
[52] U.S. Cl. ................... 318/590.000; 318/567.000; 318/460.000; 297/284.400
[58] Field of Search ...................... 318/567, 590, 318/591, 114, 119, 120, 129, 281, 283, 284, 443, 444, 460; 297/180.1, 180.2, 284.1, 284.2, 284.4

[56] References Cited

U.S. PATENT DOCUMENTS

| | | |
|---|---|---|
| 4,865,379 | 9/1989 | Aoki et al. . |
| 4,981,131 | 1/1991 | Hazard ........................................ 128/38 |
| 5,065,079 | 11/1991 | Ogasawara . |
| 5,243,267 | 11/1991 | Ogasawara . |
| 5,429,585 | 7/1995 | Liang ........................................ 601/15 |

FOREIGN PATENT DOCUMENTS 5-317138   12/1993   Japan .

*Primary Examiner*—Bentsu Ro
*Attorney, Agent, or Firm*—Oldham & Oldham Co.

[57] ABSTRACT

Method and system for alleviating a fatigue in a seat, wherein there are provided, in combination, a lumbar support mechanism for moving a lumbar support plate towards and away from a lumbar part of a passenger on the seat and a heater for applying a heat thereto, with manual and automatic control modes arranged for operations of those two elements, which may be effected by a simple operation of switches. In the manual control mode, the lumbar support plate and the heater may be adjusted manually for their respective actions. In the automatic control mode, the lumbar support plate may be subject to a repeated reciprocating motion, while allowing the heater to work in synchronism with such reciprocating motion of lumbar support plate.

13 Claims, 7 Drawing Sheets

5,523,664

SYSTEM FOR ALLEVIATING FATIGUE IN A SEAT

BACKGROUND OF INVENTION

1. Field of the Invention

The present invention relates to method and system for alleviating a fatigue of an occupant sitting in a seat, and particularly to method and system for alleviating a fatigue which develops in the lumbar part of the occupant, by means of pressing, supporting and heating effects.

2. Description of Prior Art

Conventionally, an ordinary powered lumbar support device is designed to adjustably displace the lumbar support plate in a direction towards and away from the lumbar part of a passenger sitting on a seat for the purpose of alleviating his or her lumbar fatigue.

But, in this sort of device, the lumbar support plate is kept in a fixed position once being so adjusted, with the result that a passenger, whose lumbar part is supported at that position for long period of time, gets used to the fixed supporting force and does not feel the initial pressing support touch, and will inevitably feel uncomfortable with this unchangeable lumbar supporting state.

As a solution to this problem, known is a reciprocating type of lumbar support device, such as for example the one disclosed in the U.S. Pat. No. 5,065,079, wherein the lumbar support plate is reciprocated in the direction towards and away from the passenger's lumbar part so as to repeat pressing and non-pressing actions, alternately, thereagainst. With this repeated pressing effect, it is possible to avoid the passenger's insensible tendency to the lumbar supporting force and give a massage effect to the passenger's lumbar part.

Also, known is a lumbar part heating device which heats the lumbar part of a passenger and improves the blood circulation there to alleviate his or her corresponding part, as can be seen from the U.S. Pat. No. 4,865,379 for instance.

Certainly, one can contemplate combining together both of the above-stated lumbar support and heating devices, but, a mere combination of them in a seat will make more complicated the adjusting and switching operations, or even a short-minded reduction of the operations will adversely lose the common advantages of both lumbar support and lumbar heating. Thus, there has not been proposed any effective method and system in this respect.

SUMMARY OF THE INVENTION

In view of the above-stated drawbacks, it is a primary purpose of the present invention to provide a method for alleviating a fatigue in a seat, which permits an effective combination of lumbar support plate reciprocating motion and heating action to be carried out by simple operation of switches.

In order to achieve such purpose, in accordance with the present invention, there is basically provided the steps of:

providing an electric control means and a switch means;

providing a manual control mode for permitting a lumbar support plate, which is provided in the seat, to be manually adjusted in position with respect to a lumbar part of an occupant sitting on the seat, and for permitting a heating means to be manually worked to apply a heat to the occupant's lumbar part;

allowing, in the manual control mode, one of the lumbar support plate and heating means to be actuated selectively by operation of the switch means through the electric control means;

providing an automatic control mode for automatically effecting a repeated reciprocating motion of the lumbar support plate in a direction towards and away from the occupant's lumbar part;

allowing one of the manual and automatic control modes to be effected by operation of the switch means through the electric control means; and allowing the heating means to work in synchronism with the automatic control mode, by operation of the switch means through the electric control means, so that the heat is applied by the heating means to the occupant's lumbar part during the repeated reciprocating motion of the lumbar support plate thereto.

Accordingly, the lumbar support plate motions and heating action may be carried out manually or automatically, and independently of or in combination with each other, by operation of switch.

In one aspect of the invention, it may be so arranged that in the automatic control mode, such repeated reciprocating motion of the lumbar support plate to be selectively subject, by operation of the switch means, to one of a simply repeated reciprocating mode and an interval operation mode, wherein the simply repeated reciprocating mode is arranged to effect the repeated reciprocating motion of lumbar support plate for a predetermined period of time, and the interval operation mode is arranged to effect the repeated reciprocating motion of the lumbar support plate for a first predetermined period of time and then stopping the same for a second predetermined period of time. In this arrangement, the heating means may be worked only in synchronism with the interval operation mode, so that the seat is applied by the heating means to the occupant's lumbar part, only in the interval operation mode.

The heating means may be controlled to generate a heat of low temperature in the manual control mode and generate a heat of high temperature in the automatic control mode, or controlled to generate a heat of high temperature, only for the foregoing second period of time.

It is a second purpose of the present invention to provide a system for effecting the above-described method.

To this end, the system according to the present invention, basically comprises:

a lumbar support mechanism provided in the seat, the lumbar support mechanism including a lumbar support plate and a motor operatively connected to the lumbar support plate, and being operable to cause movement of the lumbar support plate in a direction towards and away from a lumbar part of an occupant sitting on the seat;

a heating means which is so provided in the seat as to be disposed between the lumbar support mechanism and the occupant's lumbar part;

an electric control means electrically connected with the lumbar support mechanism and heating means;

a switch means electrically connected with the electric control means;

such electric control means including:

(a) a manual control mode means for permitting the lumbar support mechanism to be operated for adjusting the lumbar support plate in position with respect to the occupant's lumbar part and for permitting the heating means to apply a heat to the same occupant's lumbar plate, wherein one of the lumbar support plate and heating means may be selectively actuated by operation of the switch means;

(b) an automatic control mode means for automatically causing the motor of the lumbar support mechanism to drive such as to effect a repeated reciprocating motion of the lumbar support plate in the direction towards and away from the occupant's lumbar part;

the automatic control mode means being operable by the switch means to cause the heating means to work in a synchronistic relation therewith, so that the heat is applied by the heating means to the occupant's lumbar part during the repeated reciprocating motion of the lumbar support plate;

wherein one of the manual and automatic control modes may be effected by operation of the switch means through the electric control means.

As one aspect of the system, the automatic control mode means includes a timer means, a simply repeated reciprocating mode means for effecting the repeated reciprocating motion of said lumbar support plate for a period of time preset by said timer means, an interval timer means; and an interval operation mode means for effecting the repeated reciprocating motion of said lumbar support plate for a first period of time preset by said interval timer means and then stopping the same for a second period of time preset by the same interval timer means.

The automatic control mode means is operable to cause said heating means to work only in synchronism with the interval operation mode.

The switch means may be simply arranged by providing a manual mode switch for operating the manual control mode means, which is electrically connected with the motor and heating means via the electric control means; and an automatic mode switch for operating said automatic mode means, which is electrically connected with the motor via the electric control means.

The heating means comprises a heater element and a temperature control means capable of selectively setting one of a low temperature and a high temperature in the heater element, and further the electric control means may be arranged such that, when the manual mode means is operated, the temperature control means sets the low temperature so as to cause the heater element to generate a heat of low temperature, while by contrast, when the automatic mode means is operated, the temperature control means sets the high temperature so as to cause the heater element to generate a heat of high temperature.

Preferably, such temperature control means may comprise a low-temperature thermostat and a high-temperature thermostat, and further comprise two sub-heaters each being adapted to heat the respective low-temperature and high-temperature thermostats.

Other various features and advantages of the invention will become apparent from reading of the descriptions hereinafter, with reference to the drawings.

DETAILED DESCRIPTION OF PREFERRED EMBODIMENT OF THE INVENTION

Figure 1:
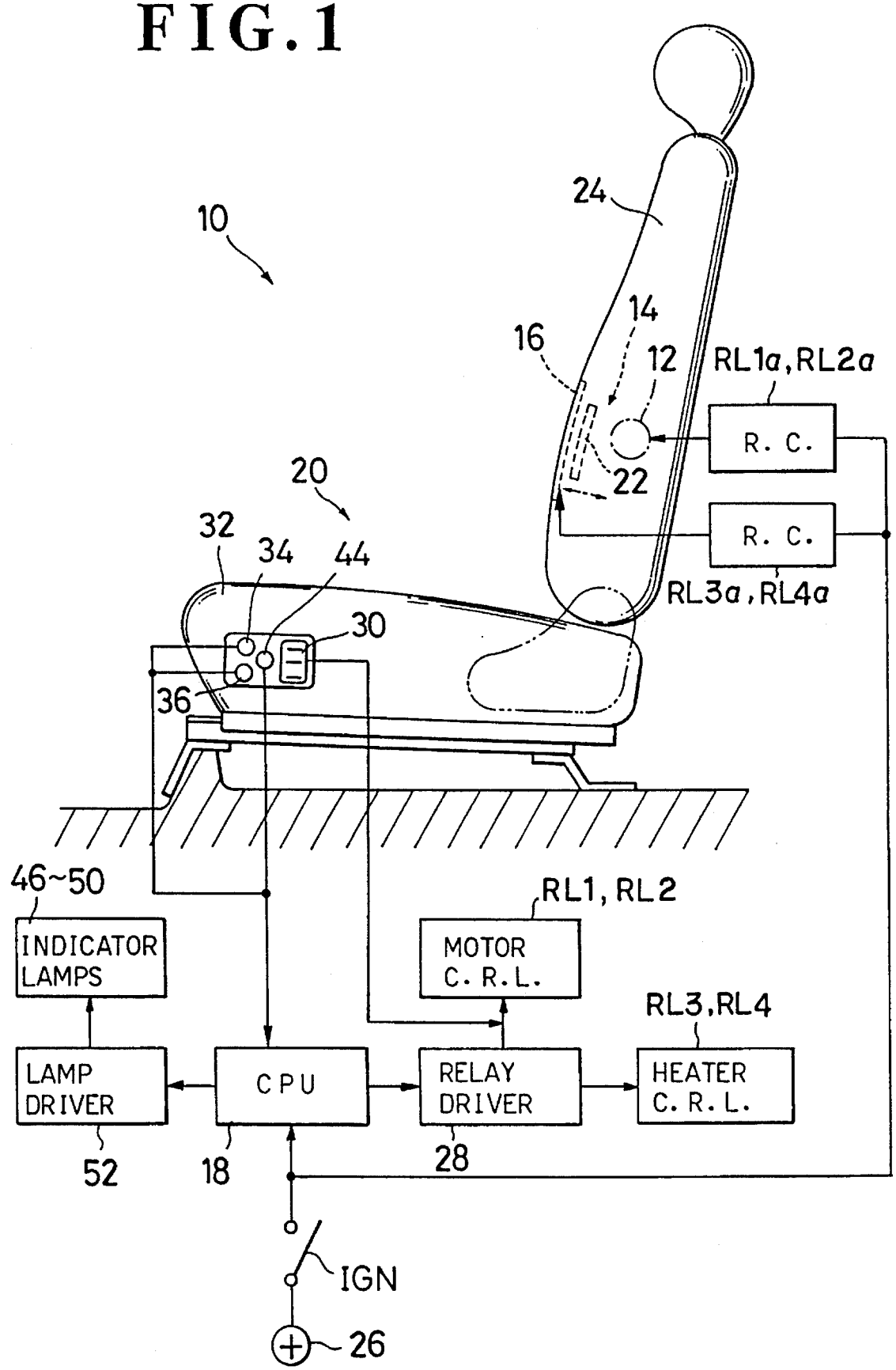
FIG. 1 is a schematic block diagram showing the present invention to be arranged in a vehicle seat by way of example.

Generally shown by designation (1) in FIG. 1, is a basic structure of a system for alleviating a fatigue of the lumbar part of a passenger sitting on a seat, in accordance with the present invention.

The fatigue alleviation system (1) is basically comprised of a lumbar support mechanism (14) having a motor (12) incorporated therein, a heater (16), and a central processing unit (18) (which shall be referred to as "CPU" hereinafter) in such an arrangement as to permit for operating a pressing support action and a heating to the lumbar part of passenger sitting on a seat (20) (in this embodiment, a vehicle seat), in combination with, or independently of each other, in order to achieve an effective alleviation of fatigue in the passenger's lumbar part.

The lumbar support mechanism (14) itself is of a known type including a lumbar support plate (22) operatively connected with the motor (12), and provided within the seat back (24) of the seat (20). The lumbar support plate (22) is disposed at a point corresponding to the lumbar part of a passenger who sits on the seat (20) and moved by the motor (12) in the direction towards and away from that passenger's lumbar part, thereby providing a pressing support thereto. But, this mechanism (14) is not the inventive subject matter of the present invention and thus further explanation thereon is omitted.

Figure 2:
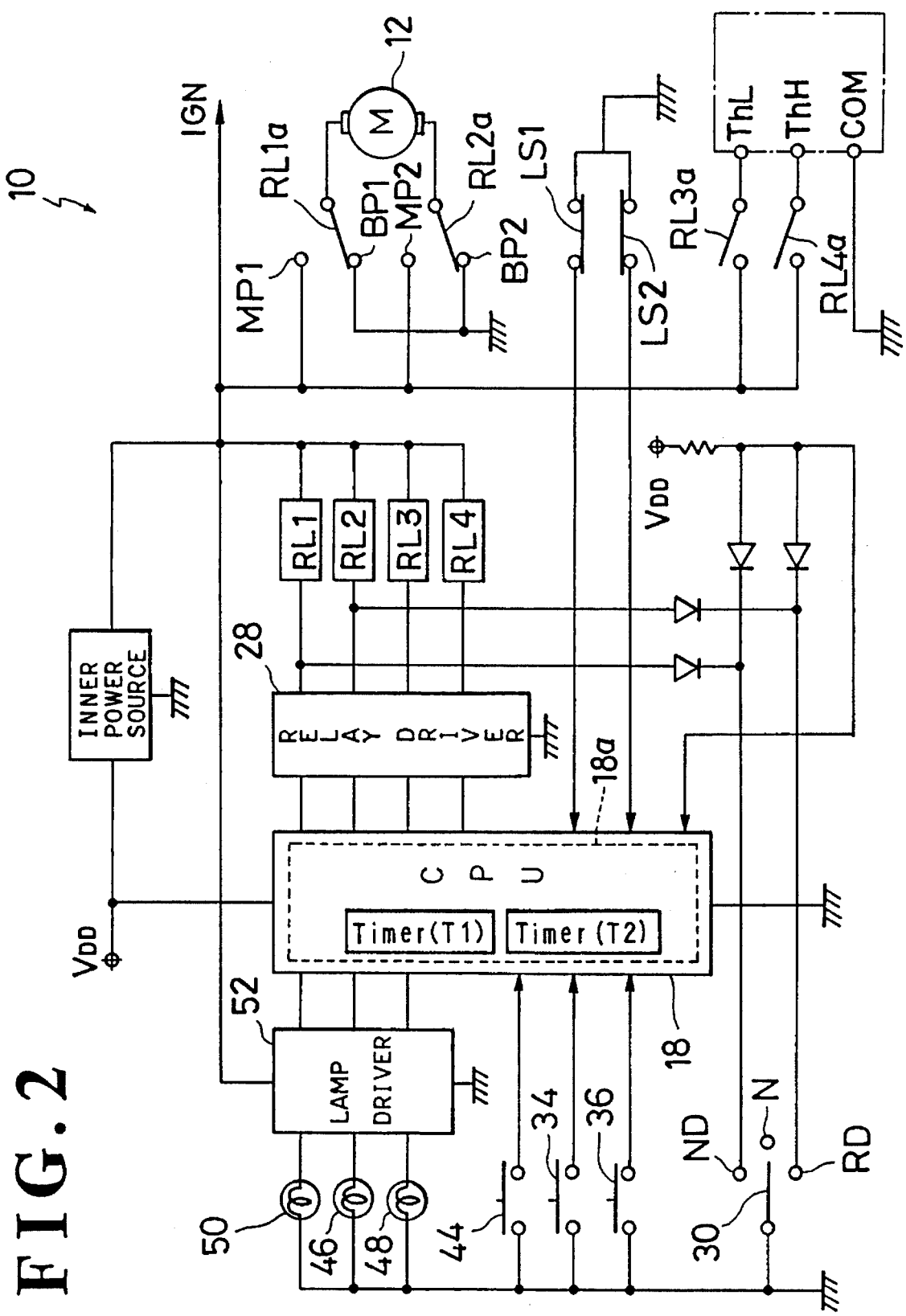
FIG. 2 is a diagram showing an electric circuits and elements associated with a fatigue alleviating system in accordance with the present invention.

As can be seen from FIGS. 1 and 2, the motor (12) in the lumbar support mechanism (14) is electrically connected to a power source (26) via motor control relays (RL1, RL2) which each have their respective contact elements (RL1a, MP1, BP1)(RL1a, MP2, BP2) and an ignition switch (IGN). The power source (26) may be a battery in a vehicle, and the motor control relays be electro-magnetic relays, or the like.

The motor control relays (RL1, RL2) are electrically connected via a relay driver (28) to the CPU (18).

The CPU (18) includes a microcomputer (18a), a simple timer (T1) and an interval timer (T2). By means of the microcomputer (18a), the CPU (18) processes an input data according to a program stored in memory therein, and sends a proper control signal to a relevant drive circuitry or drive mechanism. For instance, if the control signal is output from the CPU (18) for control of the motor (12), the signal is input to the relay driver (28) which energizes or deenergizes one of the motor control relays (RL1, RL2) so as to bring the corresponding one of the associated relay contacts (RL1a or RL2a) in contact with one of the make and brake contact points (MP1, BP1 or MP2, BP2), so that the motor (12) is driven in a normal or reverse direction, causing the lumbar support plate (22) to move forwardly or backwardly of the seat back (24) in the direction towards or away from the lumbar part of a passenger on the seat (20).

A manual switch (30) is provided for effecting the foregoing energization and deenergization of motor control relays (RL1, RL2), which has a neutral "off" position (FP), a normal "on" position (NP) and a reverse "on" position (RP). The switch (30) may be a self-return, see-saw type switch. As shown in FIG. 2, the normal and reverse "on" positions (NP)(RP) of switch (30) are electrically connected to the foregoing two motor control relays (RL1)(RL2), respectively. Hence, if the switch (3) is turned on to the normal position (NP), the corresponding relay (RL1) is energized to bring its relay contact (RL1a) in contact with the make contact point (MP1), thereby driving the motor (12) in the normal direction to cause the forward movement of lumbar support plate (22). Conversely, turning on the switch (3) to the reverse position (RP) will energize the another relay (RL2) to bring its relay contact (RL2a) in contact with the make contact point (MP2), thereby driving the motor (12) in the reverse direction to cause the backward movement of lumbar support plate (22). The manual switch (30) is disposed on the lateral wall of the seat cushion (32), as shown in FIG. 1.

The lumbar support plate (22) is limited its forward and backward movement by a forward limit switch (LS1) and a backward limit switch (LS2) which are electrically connected to the CPU (18). Though not shown, the forward limit switch (LS1) is disposed at a suitable forward limit point forwardly of the lumbar support plate (22), and the backward limit switch (LS2) is disposed at a suitable backward limit point backwardly of the same, for precise detection purpose.

According to the present invention, in addition to the above-described manual operation by the manual switch (30), the CPU (18) is so programmed to permit for effecting one of a lumbar-support-plate repeated motion mode and a lumbar-support-plate interval motion mode, selectively, under an automatic mode using the corresponding two automatic mode switches (34)(36). In other words, as an automatic mode switch for that purpose, a repeat switch (34) is provided to effect an automatic mode for repeating the forward and backward reciprocating motion of the lumbar support plate (22) for a given period of time set by the simple timer (T1), while on the other hand, an interval switch (36) is provided to effect another automatic mode for alternating such repeated reciprocating motion of lumbar support plate (22) and a pause of the same at a given interval of time set by the interval timer (T2). Both repeat and interval switches (34)(36) are electrically connected to the CUP (18). In brief, operating the repeat switch (34) will subject the lumbar support plate (22) to a repeated forward and backward motion in the seat back (24) in a reciprocating way for a predetermined period of time preset by the single timer (T1), say, approx. 7 min. On the other hand, operating the interval switch (36) will cause the lumbar support plate (22) to perform such fore-and-aft reciprocating motion for approx. 7 min. and then to be stopped for approx. 3 min. under a preset timing of the interval timer (T2). Detailed description in this regard will be made later with reference to the charts in FIGS. 4 to 7.

Figure 3:
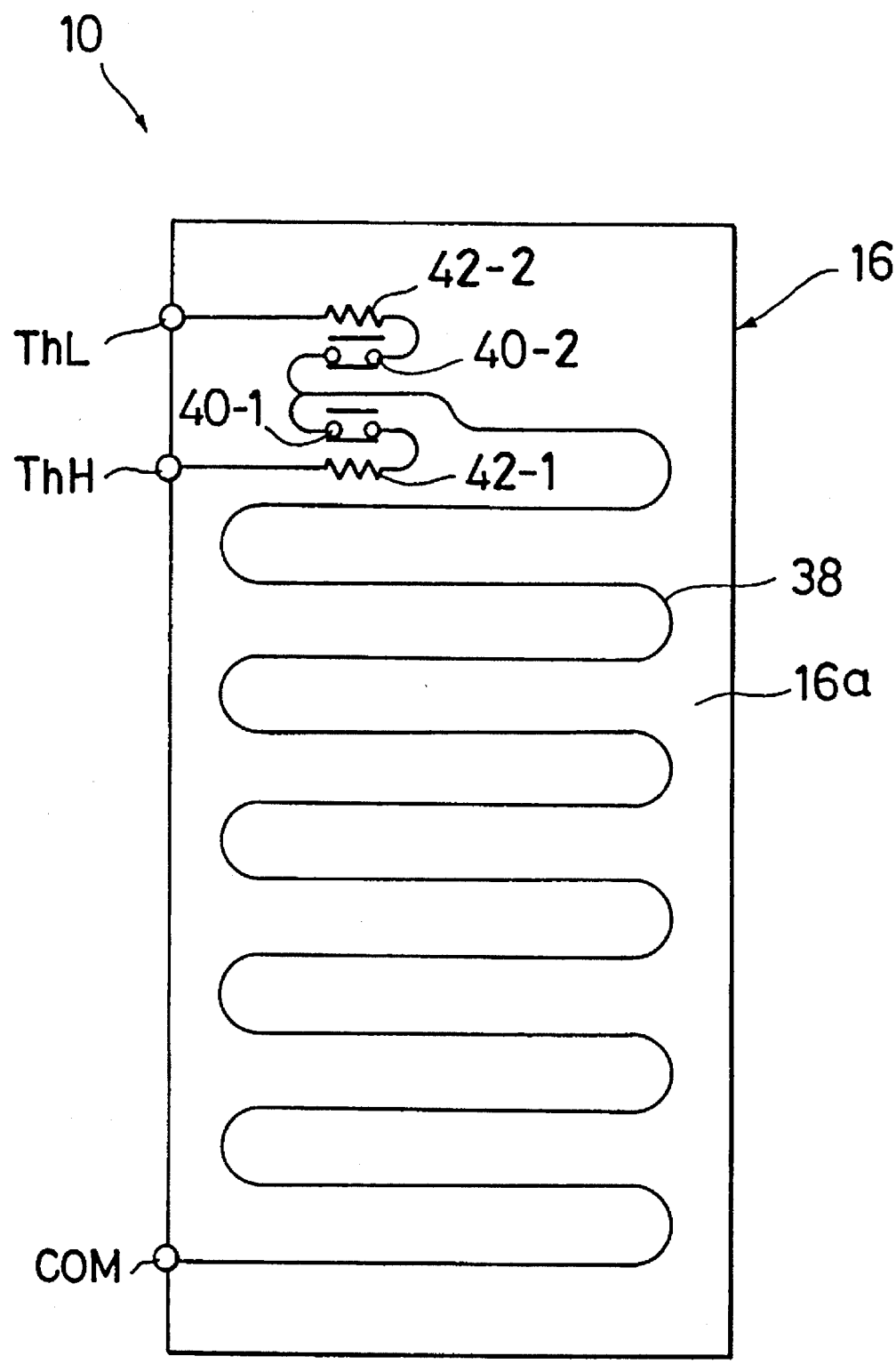
FIG. 3 is a diagram showing an electric structure of a heater in the system.

The heater (16) is situated in the upholstery layer of the seat back (24) adjacent to the frontal surface thereof, namely at a point more forward than the lumbar support plate (22), corresponding to the lumbar part of a passenger sitting on the seat (20), as viewed from FIG. 1. As best shown in FIG. 3, the heater (16) is of a thin-plate-like type, comprising a thin rectangular base cloth member (16a), a heating wire (38) fixed sinuously in the base cloth member (16a), a low-temperature thermostat (40-2) having an on-off switch point workable in a low temperature range, a high-temperature thermostat (40-1) having an on-off switch point workable in a high temperature range, a first sub-heater (42-2) for heating the low-temperature thermostat (40-2), and a second sub-heater (42-1) for heating the high-temperature thermostat (40-1). Designations (ThL) (ThH) denote a terminal of the low-temperature thermostat (40-2) and a terminal of the high-temperature thermostat (40-1), respectively. Thus, supplying a current to this heater (16) will generate a heat therein at a low or high temperature within the respective ranges limited by the two thermostats (40-2)(40-1).

The heater (16) may be set selectively to one of the low-temperature and high-temperature ranges through energization of corresponding one of two heater control relays (RL3, RL3a)(RL4, RL4a) which are controlled by the relay driver (28) and CPU (18). As can be seen in FIGS. 1 and 2, the terminal (ThL) of low-temperature thermostat (40-2) is connected via the third relay (RL3) and its relay contact (RL3a) to the power source (26), while the terminal (ThH) of high-temperature thermostat (40-1) is connected via the fourth relay (RL4) and its relay contact (RL4a) to the same power source (26). Both two relays (RL3)(RL4) are connected electrically with the CPU (18) via the relay driver (28), so that one of them may be energized or deenergized automatically by a programmed control of CPU (18), whereby the heater (16) may be switched over to either the low temperature range or the high temperature range, according to a predetermined program, as will be explained later.

Alternatively, by operation of a heater switch (44), the heater (16) may be manually set to one of the low and high temperatures, under the control of CPU (18). The heater switch (44) is of a self-return, push type and electrically connected to the CPU (18).

However, in the present embodiment, the system (1) is arranged such that the foregoing manual temperature setting of heater (16) by the heater switch (44) will only energize the third heater control relay (RL3), so that the heater (16) will normally generate a heat of low temperature only at the time of manual heat setting.

It is noted that the aforesaid low-temperature range is used for an ordinary lumbar heating in a cold weather or the like, i.e. used as an ordinary heater in the seat (20), and that the high-temperature range be set at a higher temperature by about 10° C. than the low-temperature range, for instance, for the automatic lumbar plate operation modes.

The heater control relays (RL3)(RL4) may preferably be an electro-magnetic really as similar to the motor control relays (RL1) (RL2).

As shown in FIG. 1, all the repeat, interval and heater switches (34)(36)(44) are collectively located at the same position with that of the manual switch (30) on the lateral wall of seat cushion (32), which is thus within reach of and readily accessible by a passenger on the seat (20).

According to the present embodiment, the system (10) is further arranged such that the heater (16) will work in synchronism with the aforementioned automatic lumbar support plate operations, and that particularly, such synchronized operation between the heater (16) and the automatic mode will be effected at the high temperature range, only when selecting the above-stated interval operation of the lumbar support plate (22). Detailed explanation thereon will be given later.

Referring to FIG. 2, the repeat, interval and heater switches (34)(36)(94) are also electrically connected, via the CPU (18) and indicator driver (52), with a repeat indicator lamp (46), an interval indicator lamp (48) and heating indicator lamp (50), respectively. Lighting of those lamps indicates the "on" state of the relevant switches, which shows on-going reciprocating or interval motion of the lumbar support plate (22), or the heating state of the heater (16). Preferably, each of the lamps may be different colored LED (light emitting diode) to provide a clear visual identification of the intended operations being at work. The lamps or LED indicator may be disposed at a proper location on an instrument panel or console box of a vehicle which can easily be viewed from a passenger on the seat (20).

Now, a description will be made of operations of the above-described system (10), with reference to the flow charts in FIGS. 4 through 7 in conjunction with FIGS. 1 and 2.

Figure 4:
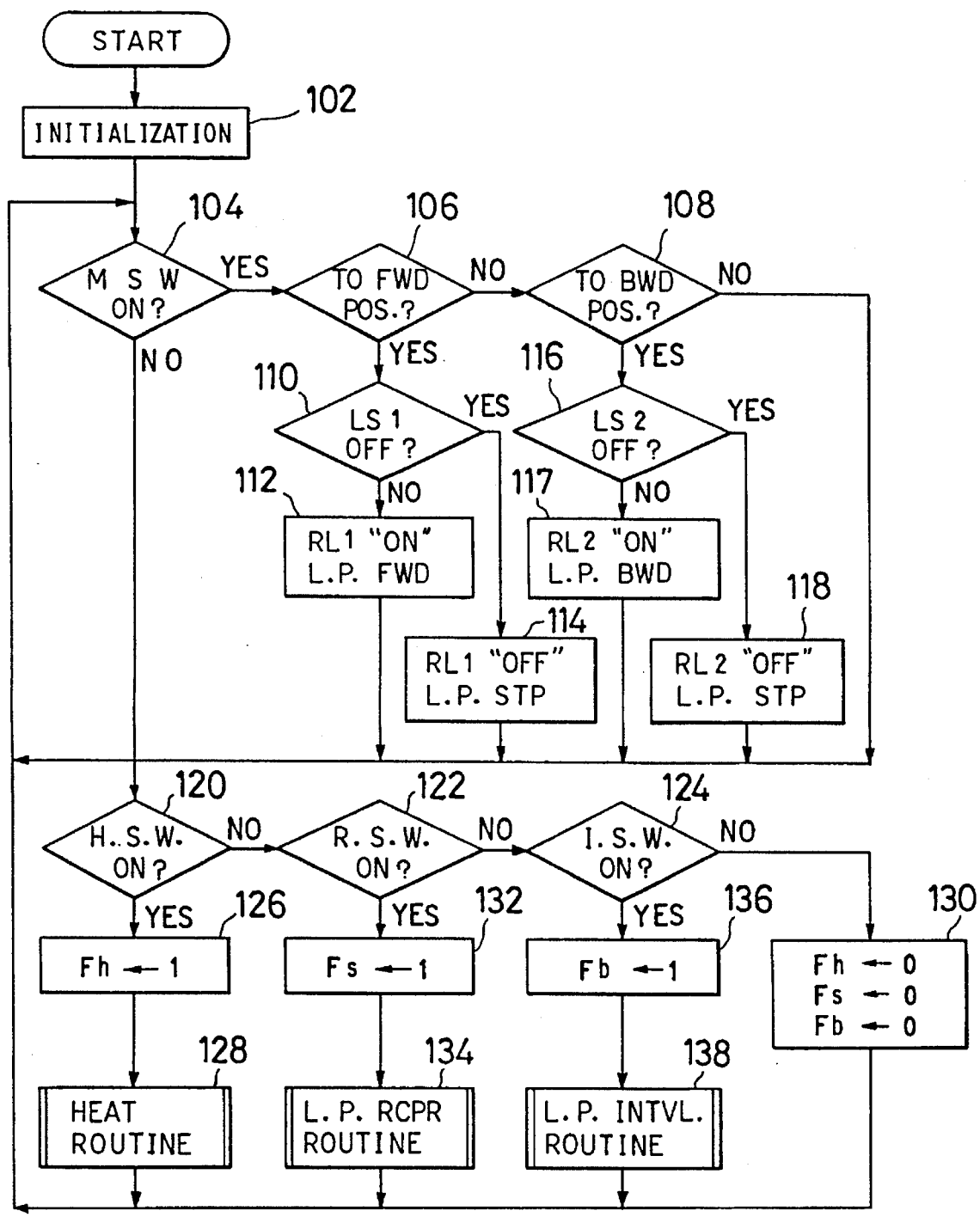
FIG. 4 is a flow chart of a main routine showing method and detailed steps for operating the system.

Firstly, as shown in FIG. 4, an initialization is made at the block (102), wherein a heater switch flag (Fh), a repeat switch flag (Fs) and an interval switch flag (Fb) are all reset to "0". Then, at next block (104), it is determined to which switch position the manual switch (30) is turned on. Assume now that the manual switch (30) is operated, an affirmative decision "YES" is made at (104). Then, at (106), it is determined whether or not the manual switch (30) is turned on to the normal switch position (ND) (see FIG. 2), and at (108), it is determined whether or not the same switch (30) is turned on to the reverse switch position (RD).

If the switch (30) is turned on to the normal position (ND), the block (106) gives the answer "YES", and at (110), it is checked up whether or not the lumbar support plate (22) reaches the backward limit point (i.e. whether or not the forward limit switch (LS1) is turned off). With the forward limit switch (LS1) being "on" at this stage and thus "NO" given at that block (110), the step flow is led to the instruction block (112) where the motor control relay (RL1) is energized to drive the motor (12) in the normal direction, causing the lumbar support plate (22) to move forwardly. At this point, to turn off the manual switch (30) (to the neutral off position (N) as in FIG. 2) will give "NO" at (104), in which case, the CPU (18) instructs to stop the drive of motor (12) at once, whereby the lumbar support plate (22) may be located at a desired position. In this respect, assume that the manual switch (30) is not turned off, letting the lumbar support plate (22) continue to move forwardly and reach the forward limit point, turning thus off the limit switch (LS1), the answer "YES" is then given at the block (110), leading the step flow to an instruction block (114) wherein the motor control relay (RL1) is deenergized to immediately stop the motor (12) and the lumbar plate plate (22) is stopped at the forward limit point.

If the manual switch (30) is turned on to the reverse position (ND), the block (106) gives "NO" decision and also the next block (108) gives "YES" decision. Then, it is checked up at (116) whether the backward limit switch (LS2) is turned off, or not. Assume now that the backward limit switch (LS2) is in the "on" state, the block (116) decides "NO", leading thus the step flow to an instruction block (117) wherein the motor control relay (RL2) is energized to drive the motor (12) in the reverse direction, whereby the lumbar support plate (22) is caused to move backwardly. After then, when the lumbar support plate (22) reaches the backward limit point, turning off the limit switch (LS2), "YES" is decided at (116), and at an instruction block (118), the motor control relay (RL2) is deenergized to stop the motor (12), so that the lumbar support plate (22) may be located at a desired backward position. In this respect, if the manual switch (30) is turned off during the backward movement of lumbar support plate (22), the block (104) gives "NO" decision, and therefore, the relay (RL2) is deenergized to stop the motor (12), whereupon the lumbar support plate (22) is stopped on the spot and thus may be located at a desired position.

The "NO" decision at (104), with the manual switch (30) turned off, will proceed the step flow to determination as to on-off state of the heater switch (44), repeat switch (34) and interval switch (36) through the respective blocks (120), (122) and (124). If, for instance, the heater switch (44) is turned on, the block answers "YES" and then at the next block (126), the corresponding flag (Fh) is set to "1" whereby the steps will be led to a heating operation routine (128) for executing a proper heating as shwon in FIG. 5.

Figure 5:
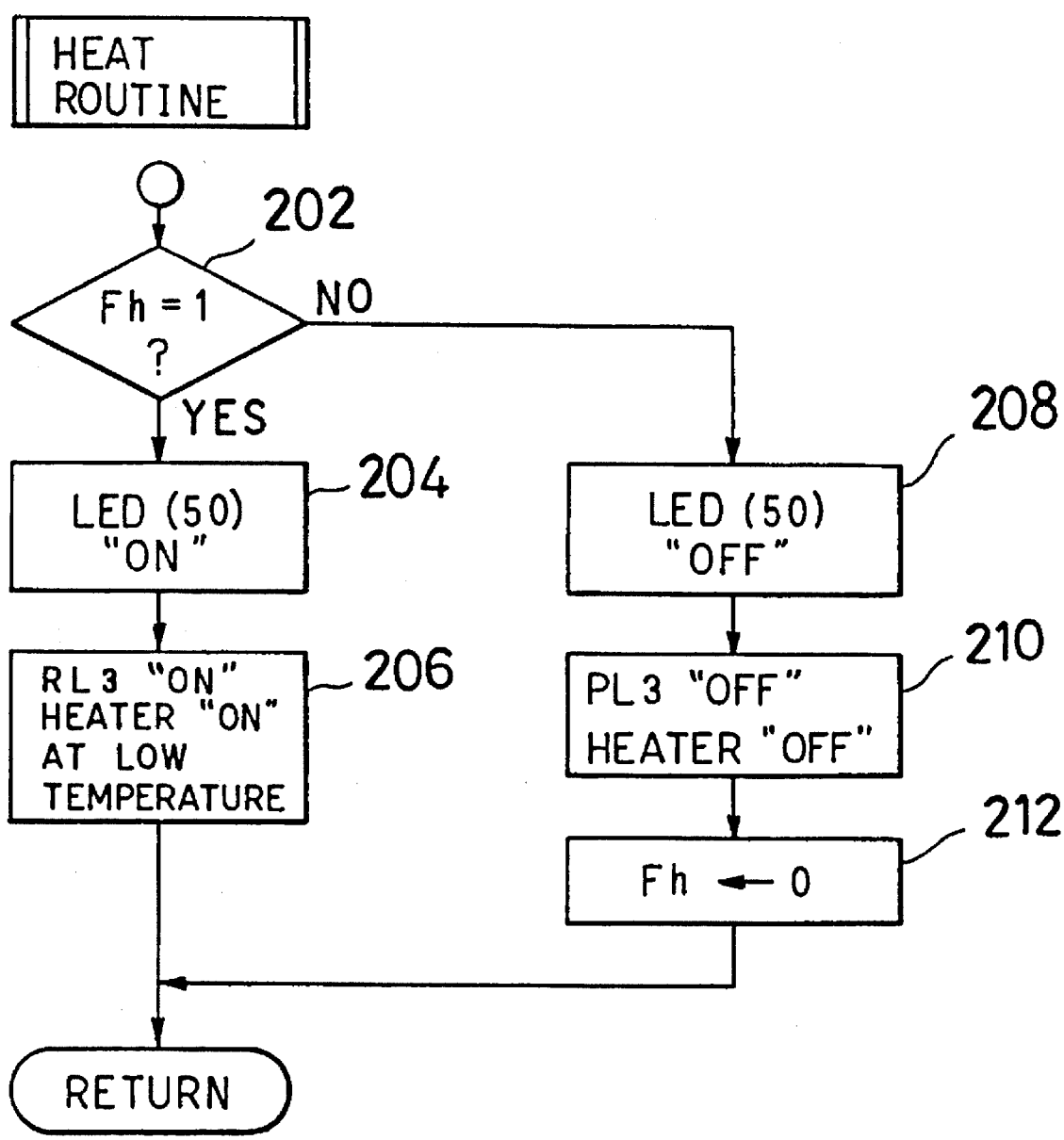
FIG. 5 is a flow chart showing the steps of a heat routine effecting a heating operation of the heater.

Referring to FIG. 5, in the heating operation routine, the first step is to ascertain whether the flag (Fh) is set to "1" or not, at a block (202). If the flag (Fh) is set to "1" "YES" is answered there, and then, at next instruction block (204), the associated lamp or LED (50) is lit on. Hence, the corresponding heater control relay (RL3) is energized to actuate the heater (16) at a given low temperature range so as to generate a heat of a low temperature constantly, as in the block (206).

In this way, a heater (16) may be manually operated by the heater switch (44) at a low temperature range, so that the lumbar part of a passenger may be warmed for a long period of time, which improves the blood circulation and alleviates a fatigue in that body portion. This is particularly effective for a passenger who does not want the pressing action of lumbar support plate (22). Further, the low temperature control in this instance prevents overheating of the heat (16) and excessive hot feeling to the passenger, presenting thus an optimal heating function in the seat (20).

In the case that the heater switch (44) is turned off, the negative "NO" decision is given at the block (120) in FIG. 4. With "NO" decision also given at another two blocks (122)(124), the step flow is led to a flag resetting block (130) wherein the flag (Fh) is reset to "0" as in the same FIG. 4. Then, at a block (202) in FIG. 5, "NO" is decided. Consequently, the LED (50) is turned off as at (208) and the relay (RL3) is deenergized to cease the heating operation of heater (16) as at (210), with the result that the flag (Fh) is reset to "0" at the final block (212), finalizing the warming of the heater (16) to the passenger's lumbar part and thus returning the step flow to the main routine in FIG. 4.

It is seen that turning on or off the heater switch (44) executes the manual operation of the heater (16).

Figure 6:
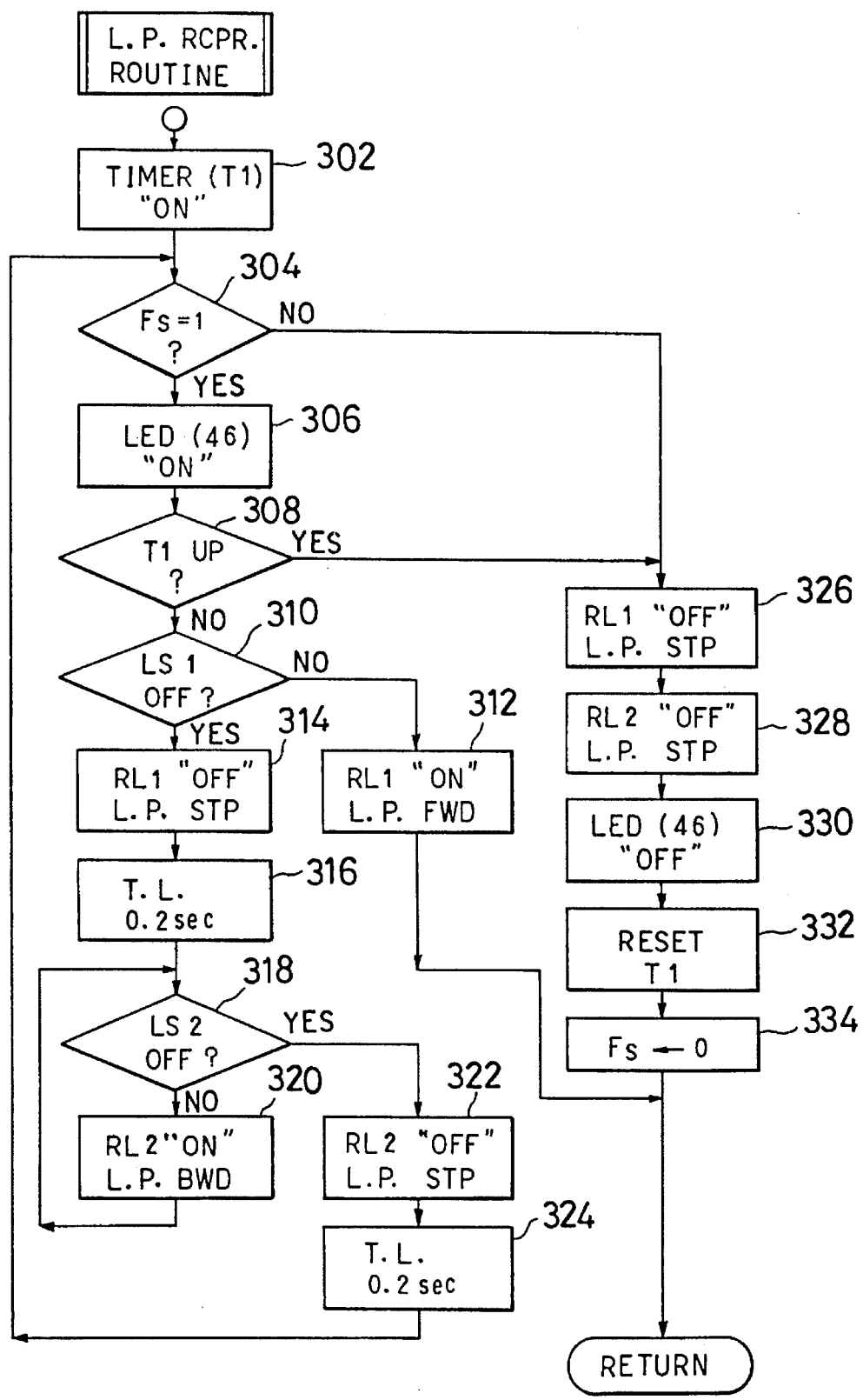
FIG. 6 is a flow chart showing the steps of a lumbar support plate reciprocating motion routine for effecting a repeated reciprocating motion of a lumbar support plate.
Figure 7:
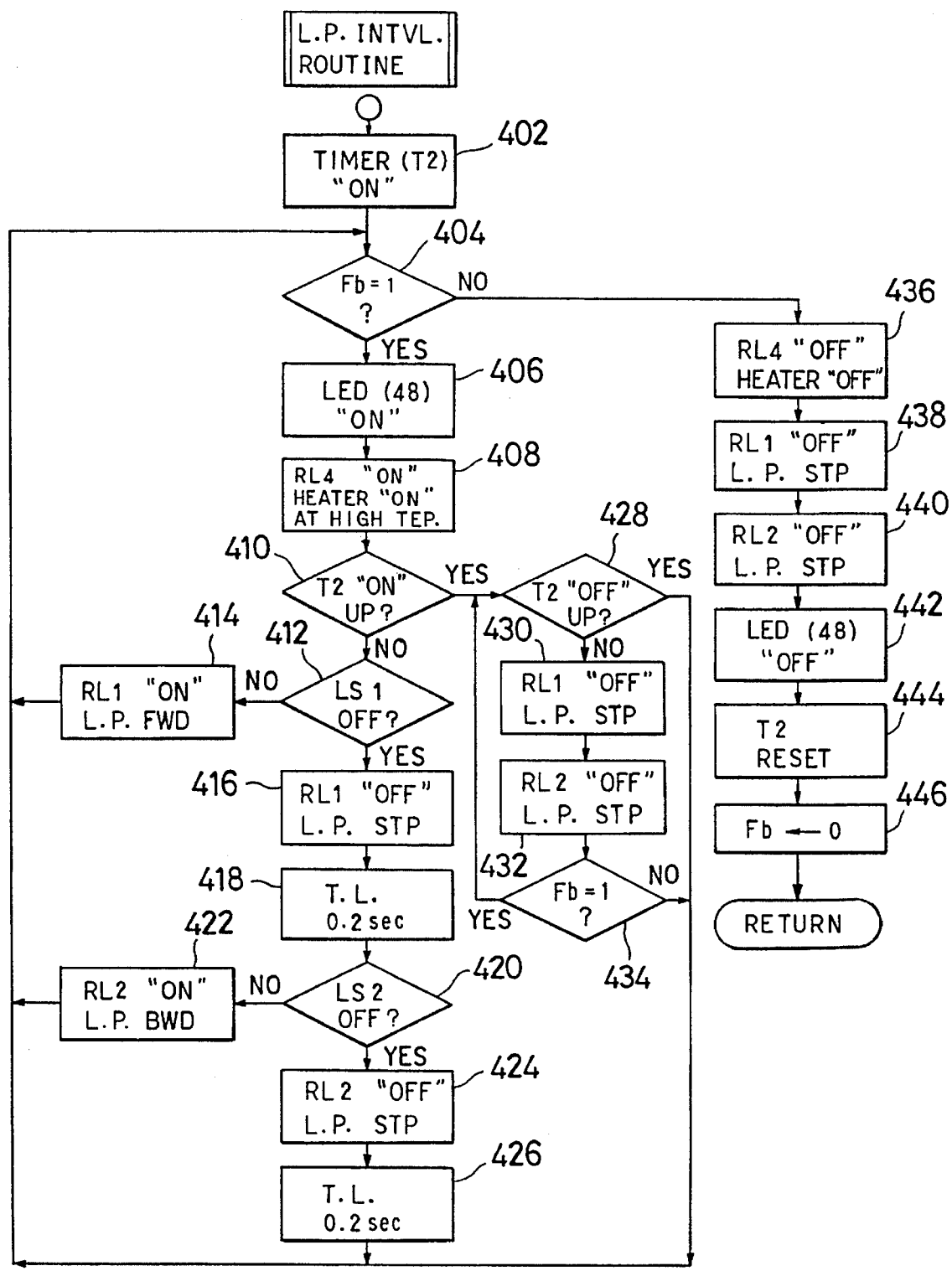
FIG. 7 is a flow chart showing the steps of a lumbar support plate interval operation routine for effecting an interval operation of the lumbar support plate.

FIG. 6 shows a routine for controlling the repeated forward and backward reciprocating motion of lumbar support plate (22). At first, whether or not the single timer (T1) provided in the CPU (18) is turned on, is determined at a first block (302). If "YES" there, the timer (T1) start counting a time up to a preset time, 7 min. At next block (304), it is checked up whether the corresponding flag (Fs) is set to "1" or not. With the flag set to "1", the decision "YES" is given at that block (304), which leads the step to an instruction block (306) wherein the corresponding LED (46) is lit on, noticing that the lumbar support plate (22) is subject to the repeated fore-and-aft reciprocating motion for 7 min. During this operation, it is checked up at (308) whether the timer (T1) finishes counting the 7 min. time, or not. At this stage, the block (308) will keep deciding "NO" until the timer (T1) completes such timing. While the timer (T1) counts time, with "NO" given at (308), it is further checked up at (310) whether the forward limit switch (LS1) is turned off, or not. If the lumbar support plate (22) does not reach the forward limit point, the block (310) decides "NO", and therefore, the step is led to a block (312) wherein the corresponding relay (RL1) is energized to drive the motor (12) in the normal direction to cause forward movement of the lumbar support plate (22). When the lumbar support plate (22) reaches the forward limit point, turning off the limit switch (LS1), the block (310) decides "YES" and leads the step flow to a block (314) for deenergizing the relay (RL1) to stop the motor (12) and thus the lumbar support plate (22).

Then, after lapse of 0.2 sec. (time lug) at (316), it is checked up at (318) whether the backward limit switch (LS2) is turned off, or not. Of course, "NO" is answered there at this point, which leads the step flow to a next instruction block (320) wherein another motor control relay (RL2) is energized to drive the motor (12) in the reverse direction so as to cause the lumbar support plate (22) to move backwardly. When the lumbar support plate (22) reaches the backward limit point, the limit switch (LS2) is turned off, giving "YES" decision at (318). Then, the step is flowed to another block (322) at which the relay (RL2) is deenergized to stop the motor (12) ant thus the backward movement of lumbar support plate (22).

After the time lag of 0.2 sec. at (324), the motor (12) is again driven in the normal direction, and controlled again in the same steps as above. In that way, the lumbar support plate (22) is subject to repeated fore-and-aft reciprocating motion for 7 min.

When the timer (T1) finishes counting the time up to 7 min., "YES" is decided at the block (308), whereupon the step undergoes two series of blocks (326)(328) through which the lumbar plate (22) is stopped, completing the fore-and-aft reciprocating motion, with both two relays (RL1)(RL2) being deenergized. At this point, the LED (46) goes off as in the next block (330), noticing the completion of such lumbar support plate reciprocating motion, and then, the timer (T1) is reset to zero, as in the block (332). Finally, at (334), the flag (Fs) is reset to "0" and the flow of step is returned to the man routine in FIG. 4.

Accordingly, it is seen that the lumbar support plate (22) is subject to repeated fore-and-aft reciprocating motion against the lumbar part of a passenger on the seat (20), thereby providing plural strokes of pressing thereagainst, which gives a finger pressing or massage effect to positively alleviate a fatigue in the passenger's lumbar part and also eliminate the tendency for the passenger to get used to the support touch of lumbar support plate.

When the interval switch (36) is turned on, "YES" is decided in the block (124), with "NO" given in all the blocks (104), (120) and (124) in FIG. 4. Then, the corresponding flag (Fb) is set to "1" at (136) and the flow step is now led to a block (138) concerning a routine for controlling the interval motion of lumbar support plate (22). Now, reference is made to FIG. 7, which shows a flow chart on such interval control routine. Initially, at (402), the interval timer (T2) provided in the CPU (18) starts counting time. Since the interval timer (T2) is designed to give a 7-min. operative period of time and thereafter 3-min. inoperative period time, the counting of time at this stage is effected up to 7 min. Then, it is checked up at (404) whether the flag (Fb) is set to 1, or not. If "YES" there, the interval LED (48) is lit on, as indicated at (406), and the heater control relay (RL4) is energized to activate the heater (16) to generate a heat of high temperature, as at (408). Then, it is ascertained, at (410), whether the timer (T2) finishes timing up to 7 min., or not. As the timer (T2) just starts counting the time at this point, the block (410) decides "NO" and at next block (412), it is determined whether the forward limit switch (LS1) is "off" or not; namely, whether the lumbar support plate (22) is located at a backward position, or not. If "NO" there, the step flow is led to an instruction block (414) wherein the motor control relay (RL1) is energized to drive the motor (12) in the normal direction, causing forward movement of the lumbar support plate (22). Upon the lumbar support plate (22) reaching the forward limit point and turning off the forward limit switch (LS1), the block (412) gives "YES" decision, and at next block (416), the relay (RL1) is deenergized to stop the motor (12) and thus the forward movement of lumbar support plate (22). After lapse of 0.2-sec. time lag at (418), it is determined at (420) whether the backward limit switch (LS2) is turned off, or not; namely, whether the plate (22) is located at a forward position, or not. If "NO" there, at a block (422), the second motor relay (RL2) is energized to drive the motor (12) in the reverse direction, causing backward movement of the lumbar support plate (22). Upon the plate (22) reaching the backward limit point and turning off the backward limit switch (LS2), the block (420) decides "YES" and at next block (424), the relay (RL2) is deenergized to stop the motor (12) and thus the lumbar support plate (22).

Then, after lapse of 0.2-sec. time lag at (426), the flow of step is returned to the block (412) for checking up whether the forward limit switch (LS1) is turned off, or not, and the subsequent procedures are followed again in the part of routine from (412) to (426) as described above in this interval control routine, so as to effect a repeated fore-and-aft reciprocating motion of the lumbar support plate (22) for the preset 7-min. period of time.

When the timer (T2) finishes counting time up to 7 min. and completes the foregoing operation time, "YES" is decided at the block (410) and step is flowed to another block (428) at which it is determined whether the timer (T2) finishes counting the 3-min. inoperative period of time, or not. As the present step just enters this particular 3-min. inoperative period of time, "NO" is answered at the block (410). Thus, at next two blocks (430)(432), both motor control relays (RL1)(RL2) are deenergized to completely cease both normal and reverse drives of motor (12), thereby placing the lumbar support plate in a stopped state, or in an inoperative state. At this moment, it is ascertained at (434) whether or not the flag (Fb) is still set to "1". Naturally, the flag (Fb) is set to "1" and "YES" is given at the block (434), whereupon the operation of the lumbar support plate (22) is kept in the inoperative state until the timer (T2) finishes counting the time up to 3 min.

After lapse of 3 minutes, the block (428) gives "YES" decision, and the step flow is returned to the block (410), starting again to undergo the same procedures of lumbar support plate fore-and-aft reciprocating motion routine from (410) to (426) for the 7-min. operative period of time set by the timer (T2), after which, again, the lumbar support plate (22) is placed in the 3-min. inoperative state.

The timer (T2) may be adjusted to repeat the above-described 7-min. and 3-min. interval timing action at desired plural rounds in order to repeat the foregoing interval operations of lumbar support plate (22) as required.

It is thus appreciated that, at the present interval routine, the lumbar support plate (22) is subject to the 7-min. repeated fore-and-aft reciprocating motion and the 3-min. stopped state, alternately, while at the same time, the heater (16) is being operated to generate a heat of a given high temperature range. This advantageously offers to the lumbar part of a passenger, both blood circulation via the heater (16) and massage effect via the repeated reciprocating motions of lumbar support plate (22), and particularly, it is most effective when the passenger suffers a great fatigue at his or her lumbar part. Further, such intermittent pressing actions of lumbar support plate (22) with the heating by the heater (16) serve to prevent the passenger from getting used to the support touch of lumbar support plate, even for a long period of time, thus keeping him or her feel a constant fresh comfortable support touch at the lumbar part.

Turning off the interval switch (36) causes the flag (Fb) to be reset to "0", and thus "NO" is decided at (404). The step flow is led to another series of blocks for ceasing all operations in this control routine, from (436) to (446). Namely, the heater (16) is turned off at (436), all the operations of lumbar support plate (22) are stopped at (438) and (440), the corresponding LED (48) goes off at (442), and then the interval timer (T2) is reset at (444). Finally, the flag (Fb) is again reset to "0" at (446), and the step flow is returned to the main routine in FIG. 4.

In the present embodiment, it is seen that the high-temperature heating of the heater (16) is imparted intermittently to the passenger's lumbar part during the 7-min. operative period, and kept directly applied thereto at the 3-min. inoperative period. But, it may be so arranged that the heater (16) works only during the 3-min. inoperative period, such as to clearly alternate the reciprocating motion of lumbar support plate (22) with the heating of heater (16).

Also, while in this embodiment the lumbar plate reciprocating motion routine shown in FIG. 6 is only directed to the repeated fore-and-aft reciprocating motion of the lumbar plate (22), yet the routine may include the steps of permitting the heating of heater (16) by manual operation of the switch (44).

The time lag of 0.2 sec. is generally most preferable, in terms of keeping a smooth flow of operations, but it is not limitative.

Accordingly, in accordance with the present invention, the lumbar support plate (14) and heater (16) may be operated under the manual control mode, while permitting the heater (16) to work in synchronism with the automatic control mode of lumbar support plate (14), as desired, by simple selective operations of one or some of the respective switches (30, 34, 36 and 48), without interference with one another. There is thus eliminated such intricate switch operation problem that might occur from the combination of lumbar support plate and heater operations.

While having described the present invention thus far, it should be understood that the invention is not limited to the illustrated embodiment, but other various modifications, replacements and additions may be applied thereto without departing from the scopes of the appended claims. Further, the present invention may be applied to other kinds of seats used in a train, ship, airplane as well as a seat for massage use or a bed for a patient or old-aged man or woman who is long confined thereto.

What is claimed is:

1. A method for alleviating fatigue in a seat, comprising the steps of:

providing an electric control means and a switch means;

providing a manual control mode for permitting a lumbar support plate, which is provided in the seat, to be manually adjusted in a position with respect to a lumbar part of an occupant sitting on the seat, and for permitting a heating means to be manually worked to apply a heat to said occupant's lumbar part;

allowing, in said manual control mode, one of said lumbar support plate and heating means to be actuated selectively by operation of said switch means through said electric control means;

providing an automatic control mode for automatically effecting a repeated reciprocating motion of said lumbar support plate in a direction towards and away from said occupant's lumbar part;

allowing said repeated reciprocating motion of said lumbar support plate to be selectively subject, by operation of said switch means, to one of a simply repeated reciprocating mode and an interval operation mode, wherein said simply repeated reciprocating mode is arranged to effect the repeated reciprocating motion of said lumbar support plate for a predetermined period of time, and said interval operation mode is arranged to effect the repeated reciprocating motion of said lumbar support plate for a first predetermined period of time and then stopping the same for a second predetermined period of time, and causing said heating means to work only in synchronism with said interval operation mode, so that the heat is applied by said heating means to said occupant's lumbar part, only in said interval operation mode;

allowing one of said manual and automatic control modes to be effected by operation of said switch means through said electric control means; and allowing said heating means to work in synchronism with said automatic control mode, by operation of said switch means through said electric control means, so that the heat is applied by the heating means to said occupant's lumbar part during said repeated reciprocating motion of said lumbar support plate thereto.

2. The method as defined in claim 1, which further includes, in said automatic control mode, the steps of allowing said repeated reciprocating motion of said lumbar support plate to be selectively subject, by operation of said switch means, to one of a simply repeated reciprocating mode and an interval operation mode, wherein said simply repeated reciprocating mode is arranged to effect the repeated reciprocating motion of said lumbar support plate for a predetermined period of time, and said interval operation mode is arranged to effect the repeated reciprocating motion of said lumbar support plate for a first predetermined period of time and then stopping the same for a second predetermined period of time.

3. The method as defined in claim 2, wherein in said interval operation mode, said first predetermined period of time is longer than said second predetermined period of time.

4. The method as defined in claim 1, which further includes the steps of controlling said heating means to generate a heat of low temperature in said manual control mode and generate a heat of high temperature in said automatic control mode.

5. The method as defined in claim 1, which further includes the steps of controlling said heating means such that said heat generated by the heating means is set at a high temperature.

6. The method as defined in claim 1, which further includes the steps of controlling said heating means to generate a heat of high temperature, only for said second predetermined period of time.

7. A system for alleviating a fatigue in a seat, comprising:

a lumbar support mechanism provided in the seat, said lumbar support mechanism including a lumbar support plate and a motor operatively connected to the lumbar support plate, and being operable to cause movement of the lumbar support plate in a direction towards and away from a lumbar part of an occupant sitting on the seat;

a heating means which is so provided in the seat as to be disposed between said lumbar support mechanism and said occupant's lumbar part;

an electric control means electrically connected with said lumbar support mechanism and heating means;

a switch means electrically connected with said electric control means;

said electric control means including:

(a) a manual control mode means for permitting said lumbar support mechanism to be operated for adjusting said lumbar support plate in position with respect to said occupant's lumbar part and for permitting said heating means to apply a heat to the same occupant's lumbar part, wherein one of said lumbar support plate and heating means is selectively actuated by operation of said switch means;

(b) an automatic control mode means for automatically causing said motor of said lumbar support mechanism to drive to effect a repeated reciprocating motion of said lumbar support plate in the direction towards and away from said occupant's lumbar part; wherein said automatic control mode means includes:

a timer means;

a simply repeated reciprocating mode means for effecting the repeated reciprocating motion of said lumbar support plate for a period of time preset by said timer means;

an interval timer means; and an interval operation mode means for effecting the repeated reciprocating motion of said lumbar support plate for a first period of time preset by said interval timer means and then stopping the same for a second period of time preset by the same interval timer means;

said automatic control mode means being operable by said switch means to cause said heating means to work in a synchronistic relation therewith, so that the heat is applied by the heating means to said occupant's lumbar part during said repeated reciprocating motion of said lumbar support plate;

wherein one of said manual and automatic control mode means is effected by operation of said switch means through said electric control means.

8. The system as defined in claim 7, wherein said automatic control mode means being operable to cause said heating means to work only in synchronism with said interval operation mode means.

9. The system as defined in claim 7, wherein, in said interval operation mode means, said first period of time is so preset by said interval timer means as to be longer than said second period of time.

10. The system as defined in claim 7, wherein said switch means comprises:

(a) a manual mode switch for operating said manual control mode means, which is electrically connected with said motor and said heating means via said electric control means;

(b) an automatic mode switch for operating said automatic control mode means, which is electronically connected with said motor via said electric control means.

11. The system as defined in claim 7, wherein said heating means comprises a heater element and a temperature control means capable of selectively setting one of a low temperature and a high temperature in said heater element, and wherein said electric control means is arranged such that, when said manual control mode means is operated, said temperature control means sets said low temperature so as to cause said heater element to generate a heat of low temperature, while by contrast, when said automatic control mode means is operated, said temperature control means sets said high temperature so as to cause said heater element to generate a heat of high temperature.

12. The system as defined in claim 11, wherein said temperature control means comprises a low-temperature thermostat and a high-temperature thermostat, and wherein said heating means further comprises two sub-heaters each being adapted to heat the respective low-temperature and high-temperature thermostats.

13. The system as defined in claim 7, wherein an indicating means is provided for noticing each of operations associated with said manual control mode means, automatic control mode means, and heating means.

* * * * *